(12) United States Patent
Nagpal et al.

(10) Patent No.: US 8,583,735 B2
(45) Date of Patent: Nov. 12, 2013

(54) DELIVERY IN SESSION INITIATED PROTOCOL (SIP) CONFERENCING

(75) Inventors: Abhinay R. Nagpal, Hadapsar (IN); Sandeep R. Patil, Elmsford, NY (US); Sri Ramanathan, Lutz, FL (US); Gandhi Sivakumar, Victoria (AU); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/948,234

(22) Filed: Nov. 17, 2010

(65) Prior Publication Data

US 2012/0124135 A1    May 17, 2012

(51) Int. Cl.
   *G06F 15/16*    (2006.01)
(52) U.S. Cl.
   USPC ........... 709/204; 709/229; 709/230; 709/231; 709/232; 709/233; 709/234; 709/235
(58) Field of Classification Search
   USPC .......... 709/204; 370/229, 230, 231, 232, 233, 370/234, 235
   See application file for complete search history.

(56) References Cited

U.S. PATENT DOCUMENTS

| | | | |
|---|---|---|---|
| 7,221,945 B2 | 5/2007 | Milford et al. | |
| 7,508,813 B2 | 3/2009 | Rogers | |
| 7,590,692 B2 | 9/2009 | Van Dyke et al. | |
| 7,738,492 B2 | 6/2010 | Lauwers et al. | |
| 2008/0063173 A1* | 3/2008 | Sarkar et al. | 379/202.01 |
| 2008/0159262 A1 | 7/2008 | Crable et al. | |
| 2008/0267380 A1* | 10/2008 | D'Amora et al. | 379/202.01 |
| 2010/0017527 A1 | 1/2010 | Kinoshita et al. | |
| 2010/0034367 A1 | 2/2010 | Das et al. | |
| 2010/0046369 A1 | 2/2010 | Zhao et al. | |
| 2010/0097932 A1 | 4/2010 | Wu | |
| 2011/0261695 A1* | 10/2011 | Zhao et al. | 370/232 |

OTHER PUBLICATIONS

"Session Initiation Protocol", http://en.wikipedia.org/wiki/Session_Initiation_Protocol, Wikipedia, Nov. 1, 2010, pp. 1-8.
"Taxonomy of congestion control", http://en.wikipedia.org/wiki/Taxonomy_of_congestion_control, Wikipedia, Mar. 2, 2010, pp. 1-4.
V. Rakocevic, "Congestion Control . . . Wireless Internet", City Univ., http://www.staff.city.ac.uk/~veselin/publications/Rakocevic_Wiley.pdf, downloaded on Nov. 5, 2010, pp. 1-23.
A. Warrier, "DiffQ: Practical Differential Backlog . . . Networks", http://netsrv.csc.ncsu.edu/export/diffg_infocom_2009.pdf, North Carolina State University, 2009, pp. 1-9.

(Continued)

*Primary Examiner* — Liangche A Wang
*Assistant Examiner* — Cheikh Ndiaye
(74) *Attorney, Agent, or Firm* — Matthew Chung; Roberts Mlotkowski Safran & Cole, P.C.

(57) ABSTRACT

A method includes determining conference data associated with a conference and determining an optimum congestion control technique for a call leg of the conference based on the conference data. The determining the conference data includes obtaining or receiving the conference data from at least one of: a Home Subscriber Service (HSS), a presence server, and a conference object. The conference is a Session Initiated Protocol (SIP) conference.

17 Claims, 5 Drawing Sheets

(56) References Cited

OTHER PUBLICATIONS

S. Boyden, "TCP Vegas Performance with Streaming Media", http://pages.cpsc.ucalgary.ca/~mahanti/papers/ipccc.07.pdf, University of Calgary, downloaded on Nov. 5, 2010, pp. 1-10.
D. Bansal, "Dynamic Behavior of Slowly Responsive Congestion Control Algorithms", SIGCOMM'01, Aug. 31, 2001, pp. 1-12.
"Bandwidth Broker", http://en.wikipedia.org/wiki/Bandwidth_Broker, Wikipedia, Oct. 20, 2010, pp. 1-2.
S Patil, "Agile Disk Replacement Strategy . . . Using Evolutionary Algorithms", http://www.computer.org/portal/web/csdl/doi/10.1109/DSDE.2010.39, Feb. 2010, abstract, pp. 1.
R. Pfeiffer, "TCP and Linux' Pluggable Congestion Control Algorithms", http://linuxgazette.net/135/pfeiffer.html, 2007, pp. 1-7.
T. Sheldon, "Congestion Control Mechanisms", http://www.linktionary.com/c/congestion.html, 2001, Big Sur Multimedia, pp. 1-10.
"TCP Congestion Control", http://condor.depaul.edu/~jkristof/technotes/congestion.pdf, downloaded on Nov. 5, 2010, pp. 1-15.
Y. Yan et al., "Composing Business Processes with Partial Observable Problem Space in Web Services Environments", IEEE, Sep. 2006, pp. 1-8.
K. Lai, "A Double-Stage Genetic Optimization Algorithm for Portfolio Selection", ICONIP 2006, Part III, LNCS 4234, 2006, pp. 928-937.

* cited by examiner

DELIVERY IN SESSION INITIATED PROTOCOL (SIP) CONFERENCING

TECHNICAL FIELD

The present invention generally relates to network communications and, more particularly, to methods and systems for improving delivery in Session Initiated Protocol (SIP) conferencing through selectively applying congestion control strategies based on data associated with SIP conferencing.

BACKGROUND

The Session Initiated Protocol is a text-based signaling protocol that can be used for controlling networked multimedia communication sessions such as voice and video calls over Internet Protocol (IP). SIP is commonly used for setting up and tearing down voice and video calls between two parties (e.g., unicast sessions) or more than two parties (e.g., multicast sessions) with one or several media streams. SIP is commonly used for large scale multiparty conferencing (e.g., up to hundreds of participants) using multicast techniques. Participants in SIP conferencing may be spread across a varied network topography and may communicate with each other via the SIP conference using numerous protocols including public switched telephone network (PSTN), mobile telephony (e.g., 2 G, 3 G, etc.), wireless broadband, wireline broadband, etc.

Network congestion may occur on shared telecommunications networks when plural users contend for access to the same data-transmission resources. Too much network congestion may lead to what is known as congestive collapse, which curtails the usefulness of the network. Congestion control deals with controlling network traffic entry into a network, so as to avoid congestive collapse by attempting to avoid oversubscription of any of the resources, e.g., processing or link capabilities of the intermediate nodes and networks. Congestion control may also involve taking resource reducing steps, such as reducing the rate of sending packets.

SUMMARY

In a first aspect of the invention, there is a method implemented in a computer infrastructure having computer executable code tangibly embodied on a computer readable storage medium having programming instructions operable to implement the steps of the method. The method includes: determining conference data associated with a conference; and determining an optimum congestion control technique for a call leg of the conference based on the conference data. The determining the conference data includes obtaining or receiving the conference data from at least one of: a Home Subscriber Service (HSS), a presence server, and a conference object. The conference is a Session Initiated Protocol (SIP) conference.

In another aspect of the invention, there is a method implemented in a computer infrastructure having computer executable code tangibly embodied on a computer readable storage medium having programming instructions operable to implement the steps of the method. The method includes: determining conference data associated with a Session Initiated Protocol (SIP) conference, wherein the conference includes a plurality of call legs associated with a plurality of conference participants. The method also includes determining a respective optimum congestion control technique for each respective one of the plurality of call legs of the conference based on the conference data in conjunction with predefined assessments of available congestion control techniques. The method further includes instructing at least one network device associated with the conference to implement the respective optimum congestion control techniques. The predefined assessments of available congestion control techniques are related to categories of the conference data. The categories of the conference data comprise at least one of: number of the conference participants, locations of the conference participants, network connections utilized by the conference participants, type of data being transferred during the conference. The determining the conference data includes obtaining or receiving the conference data from at least one of: a Home Subscriber Service (HSS), a presence server, and a conference object.

In another aspect of the invention, a system includes a conference server comprising a processor, a memory, and a congestion control application. The congestion control application operates to: determine conference data associated with a Session Initiated Protocol (SIP) conference; determine an optimum congestion control technique for a call leg of the conference based on the conference data in conjunction with assessments of available congestion control techniques; and instruct at least one network device associated with the conference to implement the optimum congestion control technique.

In an additional aspect of the invention, a computer program product comprising a computer usable storage medium having readable program code embodied in the medium is provided. The computer program product includes at least one component operable to: determine conference data associated with a conference running over a shared network; determine an optimum congestion control technique for a call leg of the conference based on the conference data in conjunction with assessments of available congestion control techniques; and instruct at least one network device associated with the conference to implement the optimum congestion control technique.

In a further aspect of the invention, a computer system for at least one of modeling and forecasting technology adoption, the system comprises a CPU, a computer readable memory and a computer readable storage media. Additionally, the system comprises first program instructions to determine conference data associated with a conference running over a shared network; second program instructions to determine an optimum congestion control technique for a call leg of the conference based on the conference data in conjunction with assessments of available congestion control techniques; and third program instructions to instruct at least one network device associated with the conference to implement the optimum congestion control technique. The first, second, and third program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to network communications and, more particularly, to methods and systems for improving delivery in Session Initiated Protocol (SIP) conferencing through selectively applying congestion control strategies based on data associated with SIP conferencing. In accordance with aspects of the invention, data associated with SIP conferencing is used to determine an optimal congestion control strategy for one or more conference users and at one or more different call legs during a conference. In embodiments, the SIP conferencing data includes, but is not limited to: user location(s) during the SIP conference, the type(s) of data being transmitted to/from a respective user during the SIP conference, and user network connection(s) (e.g., wired, WiFi, cellular, etc.) during the SIP conference. In embodiments, the conference server analyzes the SIP conferencing data and the available congestion control techniques and determines an optimal congestion control technique for each call leg of the conference. The conference server may also instruct network resources to implement the determined congestion control techniques. In this manner, implementations of the invention provide for applying an optimal congestion control strategy for a conference participant based on the participant's circumstances.

In embodiments, the determination as to which congestion control strategy to use is made using a heuristic approach or regression technique applied over factors associated with the SIP conferencing data. In exemplary implementations, the determination may be made using a genetic algorithm based approach.

In embodiments, the determination of congestion control strategies is performed prior to the conference in a predictive manner using SIP conferencing data that is available prior to the beginning of the conference. For example, as described in greater detail herein, SIP conferencing data may be available from at least one of: a conference object, a Home Subscriber Service (HSS), and a presence server. Additionally, the determination of congestion control strategies may be made in real-time based on detected changes, updates, and/or additions to the SIP conferencing data.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
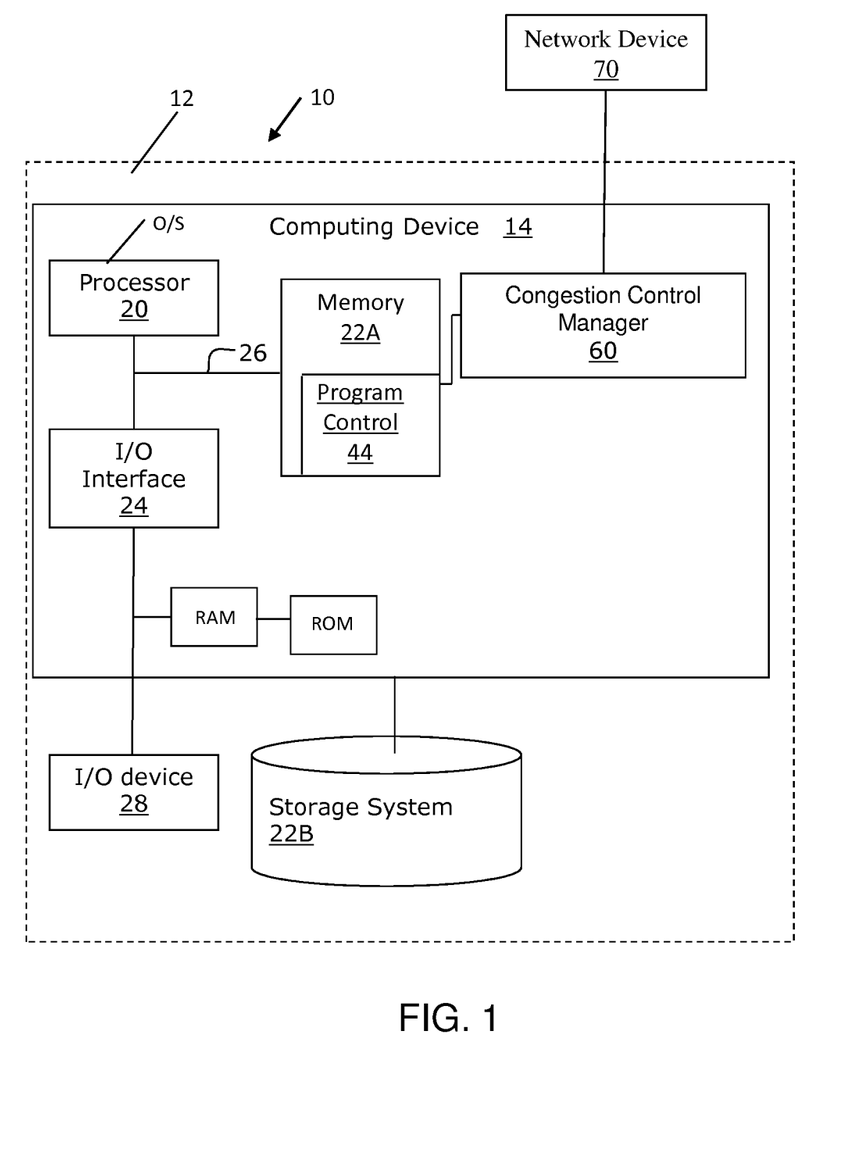
FIG. 1 an illustrative environment for implementing the steps in accordance with aspects of the invention.

FIG. 1 shows an illustrative environment 10 for managing the processes in accordance with the invention. To this extent, the environment 10 includes a server or other computing system 12 that can perform the processes described herein. In particular, the computing system 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The memory (e.g., 22A) may store business intelligence, data mining, regression analysis and/or modeling and simulation tools for execution by the processor 20.

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a congestion control manager 60 configured to perform one or more of the processes described herein. The congestion control manager 60 can be implemented as one or more program code in the program control 44 stored in memory 22A as separate or combined modules. Additionally, the congestion control manager 60 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

In accordance with aspects of the invention, the congestion control manager 60 obtains and/or receives SIP conferencing data (referred to herein as conference data) and determines a congestion control technique to apply to a call leg of a SIP conference based on the conference data. There are numerous different congestion control techniques available for use with TCP (transmission control protocol) network communication, as described in greater detail herein and as should be appreciated by one of ordinary skill in the art. In embodiments, the congestion control manager 60 utilizes predefined scores or rankings associated with a plurality of different congestion control techniques to determine an optimum congestion control technique for a particular call leg of the SIP conference. For example, each of the plurality of different congestion control techniques may have a predefined score or rank in a plurality of categories. The categories, in turn, may be related to the available SIP conferencing data. Accordingly, the congestion control manager 60 may use the available SIP conferencing data in conjunction with the predefined scores/rankings of the available congestion control techniques to determine an optimal congestion control technique for a particular call leg of the SIP conference.

In embodiments, the congestion control manager 60 communicates with at least one network device 70, and instructs the device 70 to implement the determined congestion control technique. The device 70 may be any network computing device and may comprise a TCP sender or TCP receiver. For example, the device 70 that implements a congestion control technique in accordance with aspects of the invention may comprise any of: SIP endpoints which are also individually referred to a SIP user agent (UA), web servers, routers, switches, etc. The congestion control technique may be implemented in programming of the device 70, such as TCP software running on the device 70.

In a particular exemplary embodiment, the computing device 14 comprises a SIP application server (SIP A/S) and the at least one network device 70 comprises a plurality of different computing devices acting as TCP senders and/or receivers in association with a SIP conference being managed by the SIP A/S. In implementations, the congestion control manager 60 determines a congestion control technique for at least one of the TCP senders (e.g., at least one of the network devices 70) based on the SIP conference data, and instructs the at least one of the TCP senders to implement the determined congestion control technique.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
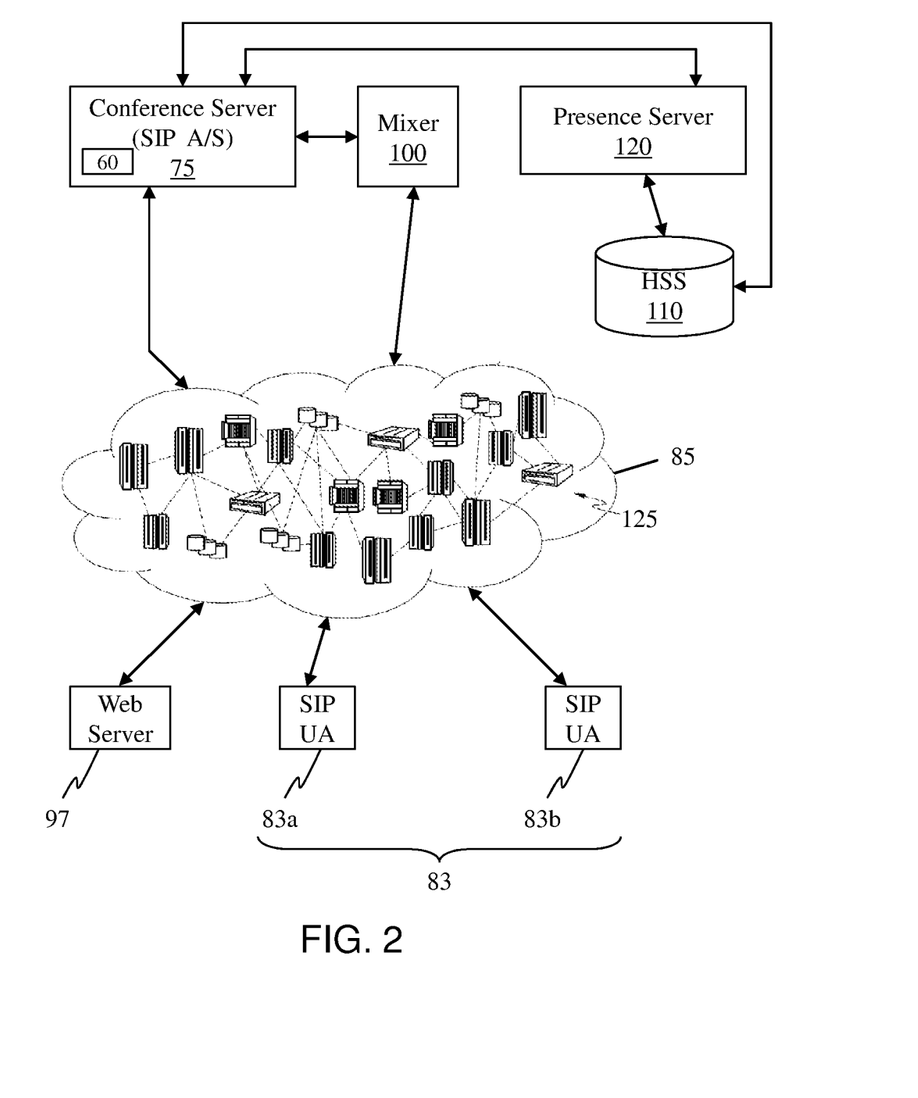
FIG. 2 shows a system in accordance with aspects of the invention.

FIG. 2 shows a system implemented in an IMS based network in accordance with aspects of the invention. The system comprises a conference server 75 which may comprise a SIP application server (SIP A/S) such as the computing device 14 including congestion control manager 60 described with respect to FIG. 1. The conference server 75 communicates with one or more SIP endpoints 83 via a network 85. The endpoints 83, which are also individually referred to a user agents (UA) 83a and 83b, may comprise any suitable SIP-compatible communication device, such as but not limited to an IP phone, PSTN phone, softphone, etc., and may be operatively connected to the network in any suitable manner, including: PSTN, mobile telephony (e.g., 2 G, 3 G, etc.), wireless broadband, wireline broadband, etc. In embodiments, the endpoints 83 are subscribers of the IMS and may become participants in a SIP conference supported by the conference server 75.

The system may further comprise a mixer 100 that communicates with the endpoints 83 and the conference server 75. In embodiments, the mixer 100 receives media streams from conference participants (e.g., endpoints 83) during SIP conferencing, mixes the media streams, and redistributes the appropriate media to respective ones of the endpoints 83. The mixer 100 may be comprised in the conference server 75 or may be a separate entity.

The system may further comprise one or more web servers 97 that may provide content to one or more of the endpoints 83 during the conference. The web servers 97 may communicate with the conference server 75 and endpoints 83 via the network 85.

In embodiments, the system additionally comprises a Home Subscriber Service (HSS) 110. The HSS (or User Profile Server Function (UPSF)) 110 is a master user database that supports the IMS network entities that actually handle calls. In embodiments, the HSS 110 contains the subscription-related information (subscriber profiles associated with the endpoints 83), performs authentication and authorization of the subscriber, and can provide information about the subscriber's physical location. The HSS 110 may function as a centralized control and management point that controls a subscriber's devices, preferences, and features. For example, the HSS 110 knows what devices a subscriber has, which devices are registered on the network, and how to contact each of the devices. The HSS 110 is similar to the GSM Home Location Register (HLR), but for IMS networks. In embodiments, the HSS 110 can store the subscriber preferences and can be represented as the storage system 22B of FIG. 1.

The system may further comprise a presence server 120. The presence server 120 in an IMS network allows watchers to monitor changes to presentities. The presence server 120 accepts, stores, and distributes presence information about the subscribers. Presence (e.g., presence state) may constitute, for example, a subscriber's availability and location, as is known such that further explanation is not necessary for a complete understanding of the invention. The presence server 120 may be implemented as a single server or have an internal structure involving multiple servers and proxies. In embodiments, the presence server 120 can obtain information from a common user profile such as the HSS 110. The presence server 120 can also obtain location based information of a user from a location platform, which may utilize a global positioning system (GPS) to determine a user's actual location. Once all of the pertinent presence information (e.g., availability, location, etc.) is received at the presence server 120, a SIP notification containing the presence information may be provided to the conference server 75 to inform the conference server 75 of the presence of any one or more of the endpoints 83. The SIP notification may include rich presence documents.

The IMS may comprise any number of SIP servers or proxies, collectively called Call Session Control Function (CSCF), to process SIP signaling packets in the IMS. For example, the IMS may comprise a Serving-CSCF (S-CSCF) as the central node of the signaling plane. The S-CSCF is a SIP server, but also performs session control. The S-CSCF interfaces to the HSS 110 to download and upload user profiles. The S-CSCF handles SIP registrations, which allows the S-CSCF to bind the user location (e.g., the IP address of the terminal) and the SIP address. Additionally, the S-CSCF sits on the path of all signaling messages, and can inspect every message. The S-CSCF decides to which application server(s) the SIP message will be forwarded, in order to provide their services and enforces the policy of the network operator.

The IMS may also include a Proxy-CSCF (P-CSCF), which is a SIP proxy that is the first point of contact for the IMS control plane. In embodiments, the terminal discovers its P-CSCF with either DHCP, or it is assigned in the PDP Context (in General Packet Radio Service (GPRS)).

The IMS may additionally include an Interrogating-CSCF (I-CSCF), which is another SIP function located within the service provider domain. The I-CSCF IP address is published in the Domain Name System (DNS) of the domain, so that remote servers can find it, and use it as a forwarding point (e.g., registering) for SIP packets to this domain. As should be understood by those skilled in the art, aspects of the service provider domain, e.g., the IMS control plane, S-CSCF, P-CSCF, and I-CSCF, as well as SIP communications are known to those skilled in the art. As such, a further description of these aspects is not deemed necessary for an understanding of the present invention.

The network 85 may comprise any shared network used for data transmission. In embodiments, the network 85 may comprise any arrangement of devices that facilitates TCP based communication between any of the conference server 75, endpoints 83, web server 97, mixer 100, HSS 110, and presence server 120. For example, the network 85 may comprise or be part of the Internet or other suitable shared network. The network 85 may comprise a number of nodes 125, such as routers, switches, servers, etc., that transmit data from senders to receivers through the network 85.

In accordance with aspects of the invention, the congestion control manager 60 determines a congestion control technique to use for a call leg of the SIP conference based in part on SIP conferencing data. The conference server 75 instructs one or more network devices 70 to implement the determined congestion control technique for the call leg. In embodiments, the one or more network devices 70 may comprise any network device that is capable of implementing a congestion control technique. For example, the one or more network devices 70 may comprise any of the SIP endpoints 83, web server 97, and nodes 125.

As described herein and in accordance with aspects of the invention, the determination of optimum congestion control strategies is based on: (1) the SIP conferencing data (e.g., conference data) and (2) predefined assessments of available congestion control techniques. As depicted in the block diagram in FIG. 3, the conference server 75 determines the conference data 300 including at least one of: conference date, conference start time, conference duration, conference schedule, number of participants (e.g., connected endpoints 83) at any given time, location of participants, network connections used by the respective participants, and type of data that is expected to be transmitted to and from the participants.

Figure 3:
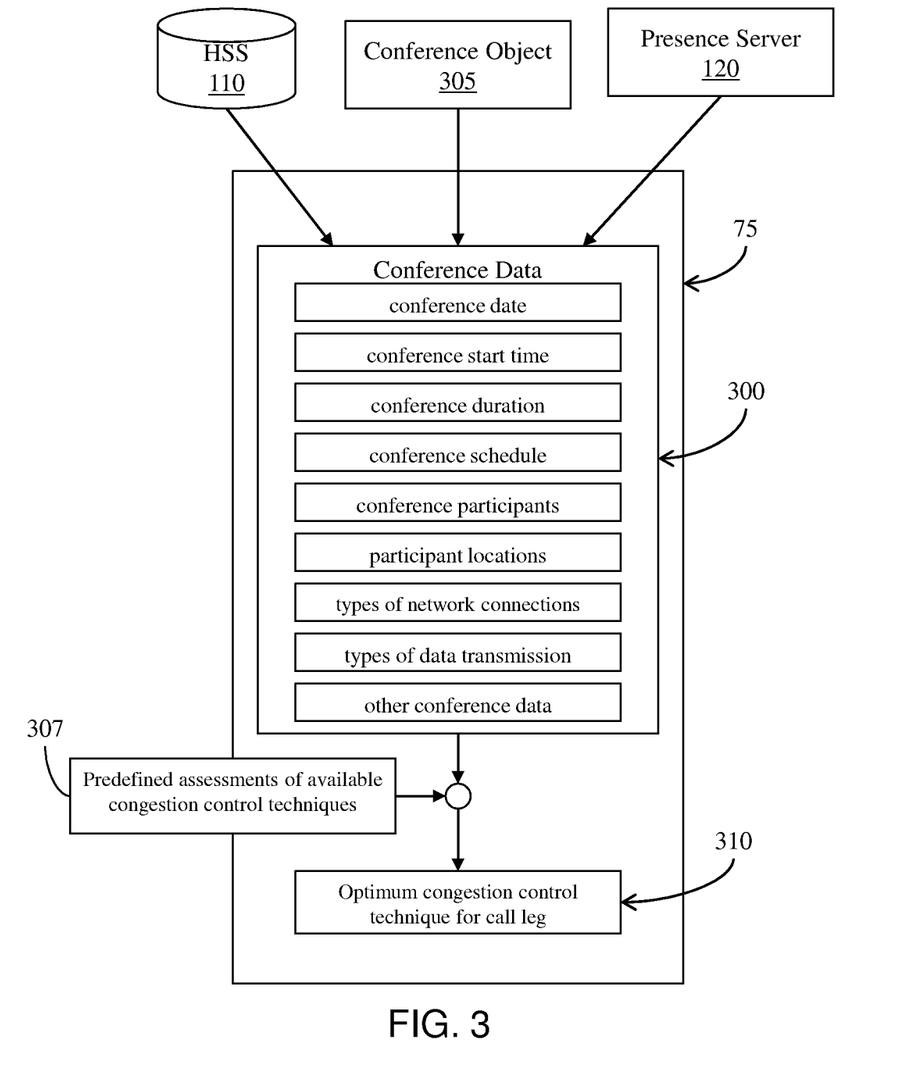
FIG. 3 shows a block diagram in accordance with aspects of the invention.

The conference server 75 determines this conference data 300 from data available from the HSS 110, presence server 120, and conference object 305 which is described in greater detail herein. In embodiments, the conference server 75 uses this conference data 300 along with predefined assessments of available congestion control techniques 307 (described in greater detail below) to determine an optimum congestion control strategy 310 for one or more call legs of the conference, e.g., for different endpoints, for different times during the conference, etc.

Figure 4:
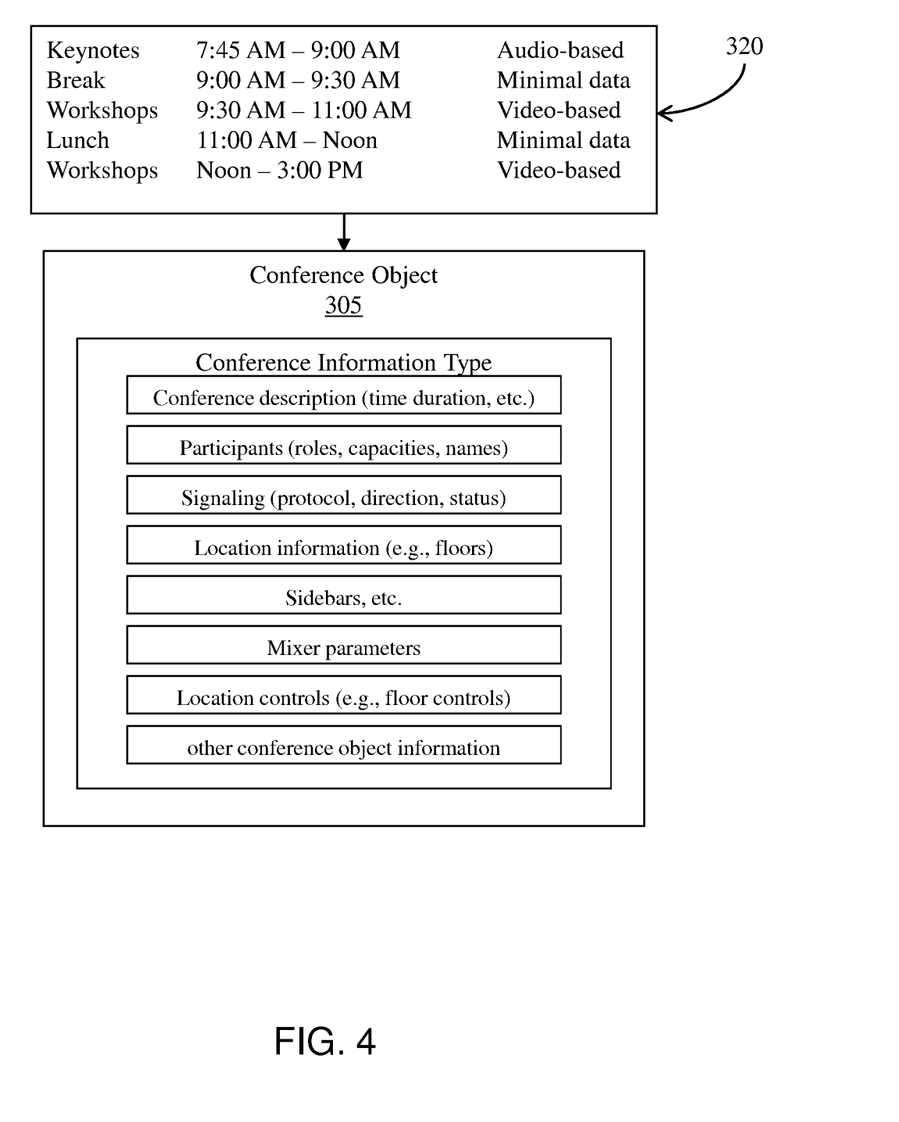
FIG. 4 shows a conference object in accordance with aspects of the invention.

FIG. 4 depicts an exemplary conference object 305. In embodiments, the conference object 305 comprises a data structure that logically represents aspects of the conference, such as: conference information type; conference description; membership; signaling; location information; sidebars; mixer parameters; location controls; and any other desired data. Any of the data in the conference object 305 may be defined prior to the start of the conference, such as conference schedule 320 (e.g., date, start time, break, lunch, end time, etc.), expected participants, expected locations, etc. Additionally, the data stored in the conference object may change as the conference progresses, e.g., based on participants joining and leaving the conference.

As noted above, the congestion control manager 60 utilizes predefined assessments of available congestion control techniques 307 in determining an optimum congestion control technique for a call leg of the conference. There are numerous congestion control techniques usable in TCP communication. In general, congestion control techniques may be categorized as: slow start, congestion avoidance, fast retransmit, and fast recovery. Particular congestion control techniques may employ programming based on one or more of these categories. For example, the Linux kernel includes the following congestion control techniques as well as programming for switching between the techniques: High Speed TCP, H-TCP, Scalable TCP, TCP BIC, TCP CUBIC, TCP Hybla, TCP Low Priority, TCP Tahoe, TCP Reno, TCP New Reno, TCP Vegas, TCP Veno, and TCP Westwood. Embodiments of the invention may utilize one or more of these congestion control techniques. However, the invention is not limited to only these noted congestion control techniques, and any suitable congestion control strategies may be used in implementations of the invention.

The respective congestion control techniques exhibit differing characteristics in the way that they control data transmission on a shared network. For example, different congestion control techniques are typically designed to provide different capabilities with respect to various parameters. These parameters might include: use in low or high bandwidth networks, use with low or high priority data transmissions, type of transmission link (e.g., wired, wireless, satellite, etc.), packet round trip time (RTT), TCP window size, and recovery time, to name a few.

For example, High Speed TCP is designed for connections with large bandwidth and large round trip time (RTT). The H-TCP strategy is usable with transmissions that recover quickly from a congestion situation and for connections having large bandwidth and RTT. The Scalable TCP strategy is designed for WAN links having large bandwidth and RTT, and is designed for a quick recovery of window size after a congestion situation. The TCP BIC strategy reduces window size by a multiplicative factor after packet loss. The TCP CUBIC strategy is similar to TCP BIC but takes less throughput from other (e.g., competing) TCP transmissions. The TCP Hybla strategy is designed for satellite link data transmission and protects against other TCP transmissions that may take bandwidth. The TCP low priority strategy is designed for low priority transmissions and utilizes excess bandwidth to avoid impacting other TCP transmissions. The TCP Tahoe strategy is designed to implement slow start, congestion avoidance, and fast recovery. The TCP Reno strategy is designed to implement slow start, congestion avoidance, fast retransmit, and fast recovery. The TCP New Reno strategy is a variation of TCP Reno that improves performance during fast recovery and fast retransmit mode. The TCP Vegas strategy evaluates the communication link quality by measuring the RTT. The TCP Veno strategy is optimized for wireless networks. The TCP Westwood strategy is designed to handle large bandwidth, large RTT, and dynamically changing network loads.

Implementations of the invention leverage the SIP conferencing data and the differences amongst the various congestion control techniques to determine an optimal congestion control strategy for one or more participants in the conference. In embodiments, the congestion control manager 60 makes this determination using conference data including, but not limited to, number of conference participants, participant location, type of network connection used by respective participants (e.g., wired, broadband wireless, cellular, etc.), type of data being transmitted (e.g., text, audio, video, streaming, etc.), priority of data being transmitted (e.g., high priority meaning little or no loss is permissible, low priority meaning more loss is permissible, etc.), conference schedule, participant presence, etc. In embodiments, the congestion control manager 60 makes this determination additionally using predefined quantitative and/or qualitative assessments of available congestion control techniques that are related to the conference data.

For example, the congestion control manager 60 may determine from the conference data that a first conference participant (e.g., endpoint 83a) is connecting to the conference from a first geographic location, using a first type of network connection, and expects to receive a first type of data. Additionally, the congestion control manager 60 may determine from the conference data that a second conference participant (e.g., endpoint 83b) is connecting to the conference from a second geographic location, using a second type of network connection, and expects to receive a second type of data. In embodiments, the congestion control manager 60 uses this conference data (e.g., participant location, network connection, and type of data) in conjunction with predefined assessments of available congestion control techniques (e.g., rankings of each available congestion control technique in different categories) to determine a first optimum congestion control technique for the first participant and a second optimum congestion control technique for the second participant.

In accordance with aspects of the invention, the determination of an optimum congestion control technique may be based at least in part on differences amongst the various available congestion control technique, such that the participant is provided with an optimum congestion control technique for their particular circumstances (e.g., user location, network connection, and type of data). In this manner, different call legs of the SIP conference (e.g., respective call legs associated with endpoints 83a and 83b) may be provided with different congestion control techniques based on the different circumstances (e.g., user location, network connection, and type of data) of the participants.

In addition to determining a respective congestion control technique for different conference participants, the congestion control manager 60 may also determine different congestion control techniques for a same participant at different times during the conference. For example, during a first time portion of the conference, a participant (e.g., endpoint 83a) may be connected to the conference from a first location (e.g., hotel room), using a first type of connection (e.g., wired broadband), and expecting a particular type of data transmission (e.g., receiving audio during the conference introduction and keynote). During a second time portion of the conference, the participant may be connected to the conference from a second location (e.g., taxi cab), using a second type of connection (e.g., cellular), and expecting a particular type of data transmission (e.g., receiving audio and video during a lecture). During a third time portion of the conference, the participant may be connected to the conference from a third location (e.g., airport), using a third type of connection (e.g., WiFi hotspot), and expecting a particular type of data transmission (e.g., receiving and sending audio and video during a conference workgroup session). In embodiments, the congestion control manager 60 uses the conference data (e.g., participant location, type of network connection, type of data being transmitted, time) to determine respective optimum congestion control techniques for the participant for the first, second, and third time periods.

In accordance with aspects of the invention, the respective optimum congestion control techniques for a participant for different time periods may be determined in advance of the time periods based on conference data that is available prior to the time periods. Additionally, the respective optimum congestion control techniques for a participant for different time periods may be determined in real time based on changes to the conference data that are obtained or sent to the congestion control manager 60, e.g., from the HSS 110 and/or presence server 120. For example, a participant may initially (e.g., prior to the conference) plan to attend the conference using a handheld SIP device using a wireless connection; however, due to a poor connection, the participant switched to using a SIP enabled soft phone using a wired connection during the conference. In this exemplary situation, the congestion control manager 60 determines a new optimum congestion control technique for the participant based on the changed circumstances (e.g., switching from a wireless connection to a wired connection). In embodiments, the congestion control manager 60 learns of the changed circumstances through changes in the conference data.

In additional embodiments, the congestion control manager 60 operates to determine a single optimum congestion control technique for a plurality of participants based on the conference data associated with each of the participants. In such implementations, the congestion control manager 60 determines a single optimum congestion control technique that is a best fit for the collective plurality of conference participants.

As described herein and in accordance with aspects of the invention, the determination of optimum congestion control strategies is based in part on predefined assessments of available congestion control techniques (e.g., described with respect to element 307 in FIG. 3). In embodiments, a list of available congestion control techniques is known to the congestion control manager 60 (e.g., stored at the conference server 75 or available to the congestion control manager 60 from another data storage location). In embodiments, each respective available congestion control technique is assigned a score for its effectiveness in categories that correspond to the SIP conference data. The scores may be any desired quantitative and/or qualitative assessment based on any desired scale, so long as the scores provide a relative comparison of respective congestion control techniques in the respective categories. For example, each congestion control technique may be assigned a numeric score ranging from one to ten in each of the categories, where the numeric score represents the relative effectiveness of a respective congestion control technique in the category.

For example, each congestion control technique may be assigned a score of 1-10 for its effectiveness in wired broadband connections. Additionally, each congestion control technique may be assigned a score of 1-10 for its effectiveness in wireless broadband connections. Also, each congestion control technique may be assigned a score of 1-10 for its effectiveness in cellular connections. Each congestion control technique may be assigned a score of 1-10 for its effectiveness with text data. Moreover, each congestion control technique may be assigned a score of 1-10 for its effectiveness with audio data. Furthermore, each congestion control technique may be assigned a score of 1-10 for its effectiveness with video data. These categories are exemplary and are not intended to limit the invention. Similar scores may be assigned to each available congestion control technique for any category corresponding to conference data (e.g., participant location, priority of data, time of day, etc.). The exemplary scale (e.g., scores from 1-10) is not limiting, and any suitable scale can be used with implementations of the invention. Moreover, the respective scores can be determined and assigned in any suitable manner. For example, the score for each category for each congestion control technique may be determined based quantitative and/or qualitative observation of past performance of such congestion control techniques. For example, a score may be assigned based on historical data. The scores may be stored in the conference server 75 or may be stored in a location that is available to the congestion control manager 60.

In accordance with aspects of the invention, the predefined scores associated with each congestion control technique are used by the congestion control manager 60 in conjunction with the conference data to determine an optimum congestion control technique for a call leg associated with a conference participant or a group of conference participants. In embodiments, the congestion control manager 60 determines the optimum congestion control technique using a heuristic approach or regression technique. For example, given the conference data associated with one or more conference participants, and given the scores of the available congestion control techniques relating to the categories of conference data, the congestion control manager 60 may use a genetic algorithm to determine an optimum congestion control technique for a call leg.

In embodiments where the congestion control manager 60 determines an optimum congestion control technique for a call leg associated with a single participant, the congestion control manager 60 sums the scores for each respective available congestion control technique and selects the congestion control technique with the highest sum as the optimum congestion control technique. For example, the conference data may indicate that a participant (e.g., endpoint 83a) is connected to the conference using a wired connection and sending and receiving audio and video data. Each available congestion control technique has a score associated with a wired connection and a score associated with audio-video data. As an example, a first congestion control technique may have a score of 2 for wired and 7 for audio-video, a second congestion control technique may have a score of 4 for wired and 9 for audio-video, and a third congestion control technique may have a score of 10 for wired and 7 for audio-video. In embodiments, the congestion control manager 60 sums the respective scores (e.g., a sum total of 9 for the first congestion control technique, 13 for the second congestion control technique, and 17 for the third congestion control technique) and designates the congestion control technique with the highest sum as the optimum congestion control technique for this particular call leg. Although this example has been described with respect to two categories (e.g., type of connection and type of data), the invention may be implemented by summing scores associated with more categories.

In embodiments where the congestion control manager 60 determines an optimum congestion control technique for plural participants, the complexity of determining an optimum solution can increase dramatically due to the possible differences in connection type, data type, etc., of the plural participants. What might be a relatively good congestion control technique for one participant may be a poor choice for another participant. Therefore, in embodiments, the congestion control manager 60 uses a genetic algorithm based approach to solve the complex problem of determining an optimum congestion control technique for plural participants.

Computer-based implementations of genetic algorithms are useful for solving large and complex numerical problems and are known to those of ordinary skill in the art. For example, genetic algorithms are described by Lai et al. in the article titled, "A Double-Stage Genetic Optimization Algorithm for Portfolio Selection", proceedings of the 13th International Conference on Neural Information Processing (ICONIP 2006), Lecture Notes in Computer Science, I King (ed), Springer, Hong Kong, PRC, Vol. 4234, pp. 928-937, the contents of which are incorporated by reference herein in their entirety. Lai et al. state that a genetic algorithm imitates the natural selection process in biological evolution with selection, crossover and mutation. That is, a genetic algorithm is procedures modeled after genetics and evolution. Genetics provide the chromosomal representation to encode the solution space of the problem while evolutionary procedures are designed to efficiently search for attractive solutions to large and complex problem. Usually, a genetic algorithm is based on the survival-of-the-fittest fashion by gradually manipulating the potential problem solutions to obtain the more superior solutions in population.

Still according to Yan et al., a fitness function can be designed to maximize the Gain Ratio and minimize the root mean square error (RMSE) of the difference between the indicator derived ranking and the actual ranking of all the listed techniques for a particular chromosome, represented by the following equation:

$$RMSE = \sqrt{\frac{1}{m}\sum_{i=1}^{m}(R_{derived} - R_{actual})^2}$$

After evolving the fitness of the population, the best chromosomes with the highest fitness value are selected by means of the roulette wheel. Thereby, the chromosomes are allocated space on a roulette wheel proportional to their fitness and thus the fittest chromosomes are more likely selected. In the following crossover step, offspring chromosomes are created by some crossover techniques. A one-point crossover technique is employed, which randomly selects a crossover point within the chromosome. Then two parent chromosomes are interchanged at this point to produce two new offspring. The mutation prevents the genetic algorithm from converging too quickly in a small area of the search space. Finally, the final generation will be judged. If yes, then the optimized results are obtained. If no, then the evaluation and reproduction steps are repeated until a certain number of generations, until a defined fitness or until a convergence criterion of the population are reached. In the ideal case, all chromosomes of the last generation have the same genes representing the optimal solution.

Genetic algorithms are also described by Yan et al. in the article titled, "Composing Business Processes with Partial Observable Problem Space in Web Services Environment," Proceedings of the 2006 IEEE International Conference on Web Services, Chicago, Ill., USA, Sep. 12-17, 2006, the contents of which are incorporated by reference herein in their entirety. According to Yan, a genetic algorithm is intrinsically parallel and inclined to determine the global optimum. Since a genetic algorithm can generate many offspring in a complete loop, it can explore the search space in a multi-direction way. The genetic algorithm has been proven to be effective at escaping local optima and discovering the global optimum through genetic operations in some problems. With crossover, there is a transfer of information between successful solutions, which means offspring can benefit from what parents have learned, and parental schemata can be mixed and combined so as to reproduce next generations with strengths of both their parents. Therefore, a genetic algorithm has a higher probability of finding the global optimal solution in a relatively short time compared with other classical heuristic search algorithms.

In embodiments, the congestion control manager 60 includes programming that implements a genetic algorithm to determine an optimum congestion control technique for a conference participant based on the combination of the conference data associated with that participant and the predefined scores of the congestion control techniques. For example, the various scores of the available congestion control techniques that correspond to the SIP conference data may be used to create a solution space which is searched for a global optimum. The invention is not limited to use with a genetic algorithm technique, however, and the congestion control manager 60 may use any suitable method of comparing the available congestion control techniques to one another for determining an optimum congestion control technique for a participant based on the conference data associated with the participant.

In embodiments, the optimum congestion control strategies may change over time due to changes in the conference data. For example, the conference schedule may be used to estimate that certain time periods will be associated with relatively low or relatively high data transmission. For example, the conference schedule may define respective time periods for: waiting for participants to log in, one-way audio transmission to participants (e.g., keynotes), video feed to participants, break time, discussion session amongst all participants (e.g., video workshops), etc., to name but a few, all of which may have different amounts and/or types of data traveling to/from the participants. Implementations of the invention may be used in a look-ahead manner to proactively optimize the optimum congestion control strategies using the conference data that is available prior to the time of the conference.

In further embodiments, the estimated data transmission may change over time based on actual occurrences. For example, although the conference object 305 may indicate an expected number of participants connecting from respective locations using respective types of network connections, the actual number of participants that sign in to the conference and/or the actual location of any respective participant and/or the actual type of network connection of any respective participant may differ from that indicated in the conference object. In such circumstances of changed conference data, the conference server 75 may update the determined optimum congestion control strategies based on the newest available conference data. The respective optimum congestion control strategies may be updated by the conference server 75 at any desired frequency, including but not limited to: based on predetermined time interval, based on occurrence of an event (e.g., a participant signs in to the conference or drops off the conference, etc.), and when data is pushed to the conference server (e.g., a subscriber's presence information via a SIP notification from the presence server 120, etc.).

In particular embodiments of the invention, information from the presence server 120 may be leveraged to update the respective optimum congestion control strategies associated with the SIP conference. For example, data contained in the conference object may indicate that a particular participant is expected to attend the conference from a particular location. At a time within a predefined time period prior to the scheduled start time of the conference, the presence server 120 may indicate that the participant is at another location different from the expected location. For example, the participant's actual location may be determined using GPS, e.g., a GPS functionality of a mobile device being carried by the participant. In embodiments, the conference server 75 may be programmed to assume, when such a disparity between an expected location and an actual location occurs within a predefined time period prior to the scheduled start time of the conference, that the particular user will be connecting to the conference from their current actual location rather than the location indicated in the conference object. This updated location information for the particular user may constitute updated conference data upon which the conference server 75 may change the optimum congestion control strategies.

Flow Diagram

Figure 5:
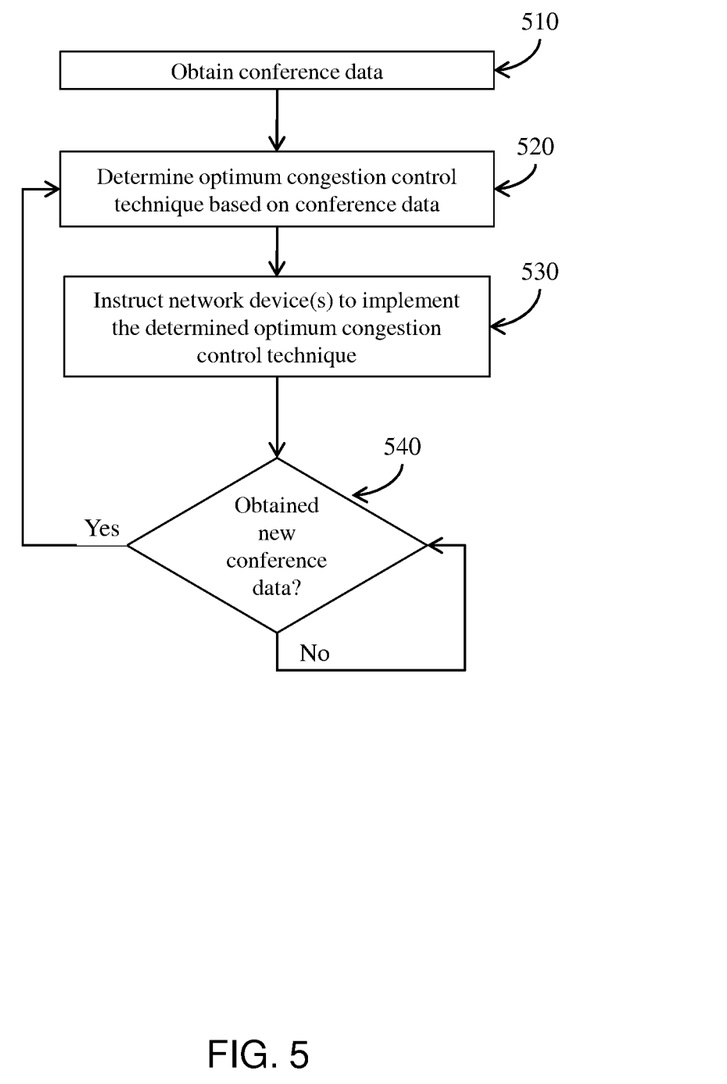
FIG. 5 shows an exemplary flow in accordance with aspects of the invention.

FIG. 5 shows an exemplary flow for performing aspects of the present invention. The steps of FIG. 5 may be implemented in the environment of FIG. 1 and/or FIG. 2, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1 and/or FIG. 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 5 depicts an exemplary flow for a process in accordance with aspects of the present invention. At step 510 the conference server (such as conference server 75 having congestion control manager 60) obtains conference data. In embodiments, the conference server obtains the conference data from at least one of the HSS, presence server, and conference object, as described above with respect to FIGS. 2-4. The conference data may include, but is not limited to: conference date, conference start time, conference duration, conference schedule, number of participants (e.g., connected endpoints 83) at any given time, location of participants, network connections used by the respective participants, and type of data that is expected to be transmitted to and from the participants, and any other data that is contained within the conference object.

At step 520, the conference server determines an optimum congestion control technique for a call leg of the conference based on the obtained conference data. As described above with respect to FIGS. 2-4, the optimum congestion control technique for any given call leg may be determined using the conference data in conjunction with predefined assessments of available congestion control techniques.

At step 530, the conference server instructs one or more network devices (e.g., devices 70) to implement the determined optimum congestion control technique. In embodiments, the conference server sends a message to at least one network device and the at least one network device implements the congestion control technique using software. Steps 510, 520, and 530 may be performed for one or more (e.g., all) call legs associated with the conference. Each respective call leg may be associated with one or more conference participants (e.g., endpoints 83).

At step 540, the conference server determines whether the conference data has changed. As described above with respect to FIGS. 2-4, this may be accomplished by obtaining new data from at least one of the HSS, presence server, and conference object. If the conference data has not changed, then the process loops back to step 540 and essentially waits for a change in conference data. If the conference data has changed, then the process returns to step 520 to determine one or more new optimum congestion control techniques based on the changed (e.g., updated) conference data, followed by step 530 for each newly determined optimum congestion control technique.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage medium having programming instructions operable to implement the steps of the method, comprising:

determining conference data associated with a conference; and determining different optimum congestion control techniques, from a plurality of available congestion control techniques for different conference participants associated with a plurality of different call legs of the conference based on the conference data, wherein the determining the different optimum congestion control techniques are performed using the conference data in conjunction with predefined assessments of the available congestion control techniques including assigning a score to each available congestion control technique, wherein the score is based on a type of connection being used by one of the different conference participants, an amount of video and audio data being sent over one of the different call legs, and an estimated data transmission time associated with each of the different call legs, wherein the predefined assessments of the available the multiple congestion control techniques are related to categories of the conference data, wherein the determining the conference data includes obtaining or receiving the conference data from at least one of: a Home Subscriber Service (HSS), a presence server, and a conference object;

the conference is a Session Initiated Protocol (SIP) conference; and the different optimum congestion control techniques control congestion on each of the plurality of different call legs associated with the different conference participants.

2. The method of claim 1, further comprising:
   obtaining new conference data; and
   determining at least a new optimum congestion control technique for another of the plurality of different call legs based on the new conference data; and
   implementing the new optimum congestion control technique for the another of the plurality of different call legs of the conference.

3. The method of claim 1, further comprising instructing at least one network device associated with the conference to implement the different determined optimum congestion control techniques.

4. The method of claim 1, further comprising performing the determining the different optimum congestion control techniques prior to a start of the conference.

5. The method of claim 1, further comprising performing the determining the different optimum congestion control techniques after a start of the conference based on changed conference data.

6. The method of claim 1, wherein the conference data comprises at least one of: conference schedule, number of conference participants, locations of participants, network connections utilized by participants, type of data being transferred during the conference.

7. The method of claim 1, wherein a service provider at least one of creates, maintains, deploys and supports the computer infrastructure.

8. The method of claim 1, wherein steps of claim 1 are provided by a service provider on a subscription, advertising, and/or fee basis.

9. A method implemented in a computer infrastructure having computer executable code tangibly embodied on a computer readable storage medium having programming instructions operable to implement the steps of the method, comprising:

determining conference data associated with a Session Initiated Protocol (SIP) conference, wherein the SIP conference includes a plurality of different call legs associated with a plurality of different conference participants;

determining a respective optimum congestion control technique from a plurality of available congestion control techniques for each respective one of the plurality of different call legs of the SIP conference based on the conference data in conjunction with predefined assessments includes assigning a score to each available congestion control technique in order to control congestion on the different call legs; and instructing at least one network device associated with the conference to implement the respective optimum congestion control techniques to the different call legs, wherein the predefined assessments of the available congestion control techniques are related to categories of the conference data;

the categories of the conference data comprise at least one of: number of the different conference participants, locations of the different conference participants, network connections utilized by the different conference participants, and type of data being transferred during the SIP conference; and the determining the conference data includes obtaining or receiving the conference data from at least one of: a Home Subscriber Service (HSS), a presence server, and a conference object; and wherein the score is based on a type of connection being used by one of the different conference participants, an amount of video and audio data being sent over one of the different call legs, and an estimated data transmission time associated with each of the different call legs.

10. A system, comprising a conference server comprising a processor, a memory, and a congestion control application, wherein the congestion control application operates to:
   determine conference data associated with a Session Initiated Protocol (SIP) conference;
   determine an optimum congestion control technique from a plurality of available congestion control techniques for a call leg of the conference based on the conference data in conjunction with predefined assessments of the available congestion control techniques;
   wherein the predefined assessments include assigning a score to each of the plurality of available congestion control techniques, wherein the score is based on a type of connection being used by one of different conference participants, an amount of video and audio data being sent over one of different call legs, and an estimated data transmission time associated with each of the different call legs,
   wherein the predefined assessments of the available congestion control techniques are related to categories of the conference data and
   wherein the categories of the conference data comprise at least one of: number of the different conference participants, locations of the different conference participants, network connections utilized by the different conference participants, and type of data being transferred during the SIP conference; and
   instruct at least one network device associated with the conference to implement the optimum congestion control technique to the call leg.

11. The system of claim 10, wherein the determining the conference data includes obtaining or receiving the conference data from at least one of: a Home Subscriber Service (HSS), a presence server, and a conference object.

12. A computer program product comprising a computer usable storage memory having readable program code embodied in the storage medium memory, the computer program code when executed on a computing device causes the computing device to:
   determine conference data associated with a conference running over a shared network;
   determine a first optimum congestion control technique from a plurality of available congestion control techniques for a first call leg of the conference associated with a first conference participant based on the conference data in conjunction with assessments of the available congestion control techniques;
   determine a second optimum congestion control technique from the plurality of available congestion control techniques for a second call leg of the conference associated with a second conference participant based on the conference data in conjunction with the assessments of the available congestion control techniques;
   wherein the assessments include assigning a score to each of the plurality of available congestion control techniques, wherein the score is based on a type of connection being used by the first or second conference participant, an amount of video and audio data being sent over the first or second call leg, and an estimated data transmission time associated with the first or second call leg, and wherein the assessments of the available congestion control techniques are related to categories of the conference data; and
   instruct at least one network device associated with the conference to implement the first optimum congestion control technique to the first call leg and the second optimum congestion control technique to the second call leg to control congestion on the first call leg and the second call leg.

13. A computer system for optimizing power usage in a network, the system comprising:
   a CPU, a computer readable memory, and a computer readable storage media; first program instructions to determine conference data associated with a conference running over a shared network;
   second program instructions to determine an optimum congestion control technique from a plurality of available congestion control techniques for a call leg of the conference based on the conference data in conjunction with assessments of the available congestion control techniques, wherein the conference includes a plurality of different call legs associated with a plurality of different conference participants,
   wherein the assessments including an assigned score to each of the available congestion control techniques, wherein the score is based on a type of connection being used by one of the different conference participants, an amount of video and audio data being sent over one of the different call legs, and an estimated data transmission time associated with each of the different call legs, and wherein the assessments of the available congestion control techniques are related to categories of the conference data; and
   third program instructions to instruct at least one network device associated with the conference to implement the optimum congestion control technique to the call leg, wherein the first, second, and third program instructions are stored on the computer readable storage media for execution by the CPU via the computer readable memory.

14. The system of claim 13, wherein the determining the conference data includes obtaining or receiving the conference data from at least one of: a Home Subscriber Service (HSS), a presence server, and a conference object.

15. The system of claim 14, wherein the conference is a Session Initiated Protocol (SIP) conference.

16. The method of claim 1, wherein the scores are analyzed by using a fitness function that maximizes a gain ratio and minimizes a root mean square error (RSME) of a difference between different scores for each of the available congestion control techniques.

17. The method of claim 16, further comprising predicting future optimum congestion control techniques by using the conference data that is available prior to a time of the conference.

* * * * *